W. H. NORTHALL.
VEHICLE WHEEL TIRE.
APPLICATION FILED DEC. 12, 1919.
1,365,057.
Patented Jan. 11, 1921.
2 SHEETS—SHEET 1.
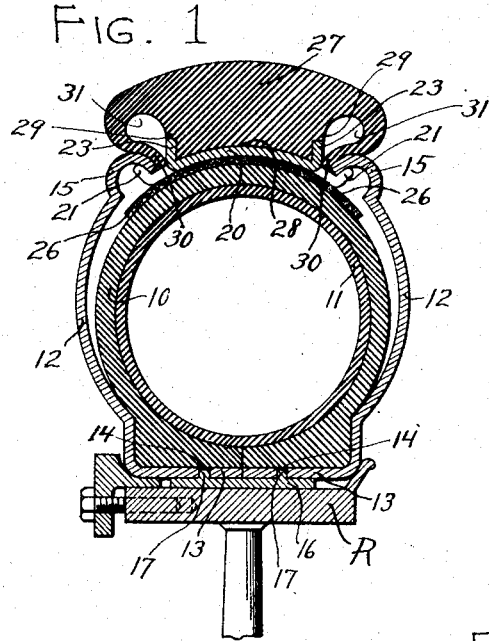
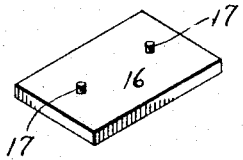
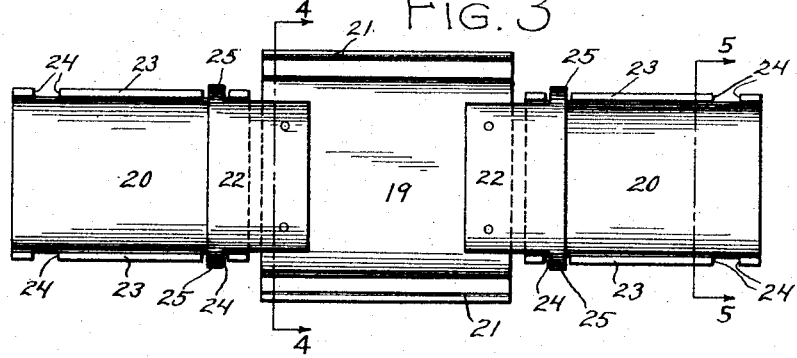
William H. Northall
INVENTOR

W. H. NORTHALL.
VEHICLE WHEEL TIRE.
APPLICATION FILED DEC. 12, 1919.

1,365,057.

Patented Jan. 11, 1921.
2 SHEETS—SHEET 2.

William H. Northall
INVENTOR

WITNESSES

By ATTORNEY

UNITED STATES PATENT OFFICE.

WILLIAM H. NORTHALL, OF EVANSVILLE, INDIANA, ASSIGNOR OF ONE-FOURTH TO SAMUEL C. JAMES AND ONE-FOURTH TO HERBERT MALES, OF EVANSVILLE, INDIANA.

VEHICLE-WHEEL TIRE.

1,365,057.     Specification of Letters Patent.     Patented Jan. 11, 1921.

Application filed December 12, 1919. Serial No. 344,363.

*To all whom it may concern:*

Be it known that I, WILLIAM H. NORTHALL, a citizen of the United States, residing at Evansville, in the county of Vanderburg and State of Indiana, have invented a new and useful Vehicle-Wheel Tire, of which the following is a specification.

This invention relates to tires adapted for either automobiles or motor trucks.

The object of the invention is to provide a tire which is capable of the service that a solid tire will render but which has all the advantages of the ordinary type of pneumatic tire.

In accordance with the invention, a pneumatic tire of conventional construction is inclosed in an outer casing comprising a metallic side portion and a heavy solid rubber tread interlocked with the metallic part. A feature of the invention is the means employed to hold the solid rubber tread upon the tread of the pneumatic tire, said means comprising an annular ring made up of a series of flanged links alternately broad and narrow, the links being connected by thin resilient metal plates. The broader links are designed to interlock with the metallic side protecting portion of the casing, while the narrow links are designed to hold the solid rubber tread in place. The construction is such that both the metallic side protecting portion and the linked ring may be readily assembled or dismantled.

The pneumatic tire of ordinary construction, which is used in connection with the invention, comprises a fabric or cord casing and an inner tube. The metallic parts which protect the sides of the inclosed rubber tire will allow a slight movement of the outer solid rubber tread to yield to forces tending to compress the tire while not exposing the protected inner tire to mud, sand, water or to the wearing effects of the roadway. The construction of the tire is such that it has an indefinite life in all parts, except the outer movable solid rubber tread, which latter when worn out may be replaced at relatively small cost, whereupon the tire is effectively a new tire.

The invention will be best understood from a consideration of the following detailed description taken in connection with the accompanying drawings forming part of this specification, with the understanding, however, that the invention is not confined to any strict conformity with the showing of the drawings, but may be changed and modified, so long as such changes and modifications mark no material departure from the salient features of the invention, as expressed in the appended claims.

In the drawings:—

Figure 1 is a radial transverse cross sectional view of an embodiment of the invention, shown in place on a wheel, only the rim and spoke of which is shown.

Fig. 3 is a top plan view of a section of the linked ring which holds the removable solid tread and the metallic side portions together.

Fig. 4 is a section on the line 4—4 of Fig. 3.

Fig. 5 is a section on the line 5—5 of Fig. 3.

Fig. 6 is a perspective view of the locking means for the sections of the metallic portion of the casing.

Figure 2:
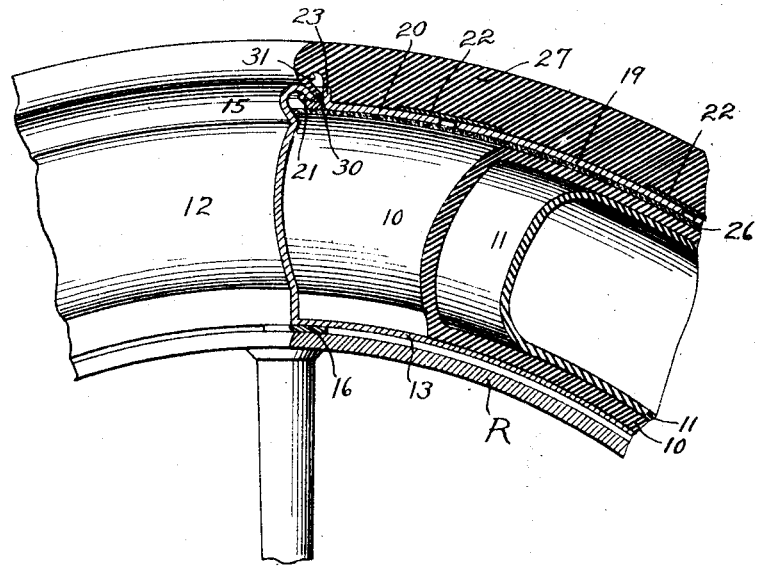
Fig. 2 is a side elevation of the same, with some parts broken away and in section to disclose the construction thereof.

An ordinary pneumatic tire of either the fabric or cord type is used as the foundation of the present improved tire. This pneumatic tire comprises a casing 10 and an inner tube 11, both of which being of well known construction will not be further described.

About this pneumatic tire as a foundation, an outer casing is assembled, the function of which is to protect the contained tire from wear whereby its life is prolonged. This casing comprises, in general, three principal parts, viz., a metallic portion surrounding the rubber tire on three sides, exposing the tread portion thereof, a linked ring seated upon the tread portion of the inclosed tire and held upon the same by interlocking connection with the metallic portion, and a solid tread mounted upon the linked ring. These parts will be considered in order.

The metallic casing comprises two like sections 12, so that a description of one will suffice for both. Each section 12 is an annular ring having an inturned flange 13 at the inner edge provided with perforations 14 at suitable intervals. The ring 12 is curved transversely so as to bulge outwardly or present a convex face upon the outside of the tire, whereby the ring 12 conforms to the curved side of the inclosed rubber tire, and may be termed a cheek plate. At that edge of the ring opposite the flange 13, a substantially semi-circular out-turned bead 15 is provided to interlock with the linked ring previously mentioned. The two rings 12 inclose the rubber tire on all sides, except at the tread portion thereof, which portion is exposed. The two rings combined form a metallic casing, the flanges 13 being of such width that when the rings are fitted about the tire, the free ends of said flanges meet or abut, and the flanges conform to embrace and fit snugly about the rim-engaging section of the casing of the pneumatic tire.

The flanges 13 are locked together in the described position by means of a plurality of plates 16, running crosswise of the tire, said plates being preferably four in number for a small automobile tire, but any number whatever may be employed, (Figs. 1 and 6). The plates 16 have two or more upstanding lugs 17 on one face thereof, and may be rectangular in form and perfectly flat on both faces. The upstanding lugs 17 are designed to snugly fit into perforations 14 provided in the flanges 13, one lug engaging with a perforation in either one of the abutted flanges. The plates 16 rest directly upon the rim R of the wheel. Thus the plates 16 are held in such position that they will at all times lock the sections 12 of the metallic part of the outer casing together. The air pressure within the inclosed pneumatic tire is sufficient to force the flanges and locking plates together so that detachment of the parts is impossible, and in view of the fact that the contained tire cannot be punctured because of the protection which the solid rubber tread affords, it will be understood that at all times there will be air pressure within said inclosed tire sufficient to lock the rings 12 securely together.

As Fig. 1 illustrates, the metallic part of the outer casing fits snugly about the contained tire at the rim engaging portion thereof, but bulges away from the same along the sides so as to allow a certain amount of play or movement of the inclosed tire within the metallic casing. The free outer ends of the rings 12 are spaced a sufficient distance from the sides of the inclosed tire to allow resilient yielding of the same when obstructions in the road are encountered. Moreover, the rings 12 are designed to be made of resilient metal, and thus will yield to sufficiently great strains without being deformed thereby.

An annular jointed or linked ring is provided to be seated upon the tread portion of the pneumatic tire between and interlocking with the free edges or beads 15 of the sections 12. This linked ring, as seen best in Fig. 3, comprises a series of plates, preferably metallic, alternate plates being of the same construction. Fig. 3 illustrates three of these plates, a broad one 19 and two narrow ones 20. The relatively broad plate 19 is curved transversely to fit upon the tread of the inclosed tire, and is provided with upstanding flanges 21 on two side edges thereof. Flat plates 22 comprising thin metal sheets of high resiliency are riveted or otherwise secured to the ends of the broad plates 19.

The narrow plates 20 are also curved transversely and have side flanges 23 upstanding from their edges which flanges have breaks or notches 24 near both ends of the plates 20. The joining or connecting plates 22 have tongues 25 at the free ends thereof projecting sidewise from the same, the tongues 25 being adapted to fit loosely within the breaks 24 in the flanges 23. Thus it is seen that adjacent broad and narrow plates 19, 20 are detachably connected with each other, so that the ring 18 may be readily built up to fit various sizes of tires.

The linked ring is placed upon the tread of the inclosed tire with the concaved faces of the plates 19, 20 conforming to the curve of the tread. The outstanding flanges 21 of the plates 19 fit within the beads 15 so as to lock the linked ring upon its seat, while permitting movement of the ring inwardly to yield to heavy blows encountered in travel. Because of the fact that the linked ring is of metal, and is subject to considerable movement as the tire yields to strains, a cotton or other fabric liner 26 (Figs. 1 and 2), is preferably inserted upon the tread of the pneumatic tire before the linked ring is assembled thereon. This cotton liner will prevent abrading of the tread due to movement of the metal links, besides insuring a tighter and more satisfactory fit of the various parts.

A solid rubber tread 27 of special construction is adapted to be mounted upon the linked ring. This rubber tread may be of any desired thickness but must have such a width that it may be seated upon the narrow plates 20 between the upstanding flanges 23. When so seated the rubber tread, by reason of its resiliency, will prevent the tongues 25 of the connecting plates 22 from working out of the breaks 24 in the flanges 23, but will nevertheless allow limited movement of said tongues in said breaks in peripheral directions. The tread 27 is preferably provided with a transversely curved inner bearing surface 28 adapted to fit upon the transversely curved plates 20 and also with shoulders 29 running annularly with the tread. The shoulders 29 fit upon the upper free ends of the flanges 23, as shown in Fig. 1.

The tread is also provided on either side with a flexible lip 30, which lip 30 runs annularly with the rim, and has sufficient width to engage with the free end or bead 15 of the adjacent section 12 of the casing. When this engagement takes place, an air cushion 31 is left on either side of the tread above the bead 15 and outside of the flange 23. The free edge of the lip 30 is tucked between the free edge of the bead 15 and the corresponding flange 23. Thus, when movement of the tread takes place responsive to unusual strains, the inclosed tire will yield inwardly and the flanges 21 will move inwardly within the spaces provided by the semi-circular beads 15, while the lips 30 will yield more or less, permitting the beads 15 to push the same inwardly against the resistance of the air cushion. A further advantage of the annular lips is that water, sand, mud and the like are prevented from working their way under the interlocking connection between the linked ring and the metallic casing rings 12. If this occurred, the inner tire would be subjected to influences which would tend to rot the same, thus reducing its life.

Figure 7:
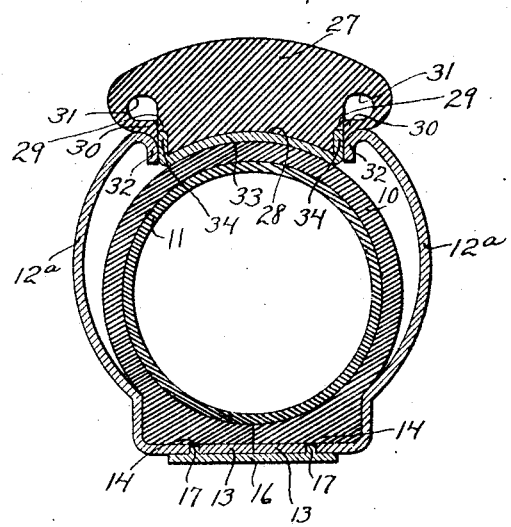
Fig. 7 is a radial transverse cross sectional view of a slightly modified form of the invention.

The modification disclosed in Fig. 7 comprises all the principal parts previously mentioned, but eliminates the cotton liner 26 and uses a somewhat modified form of metallic casing. Here the sections 12ª have beads 32 which are more in the nature of inturned flanges, and which have no interlocking connection with other parts. In place of the linked ring described above with its alternately broad and narrow links, a linked ring comprising plates 33 similar in all respects to plates 20 is used. These plates 33 are joined together by resilient thin connecting plates similar to the joining plates 22 previously described. The tread, in this construction, fits in exactly the same way upon the linked ring, but is held by the flanges 34 of each plate instead of each alternate plate. The lips of the tread fit, as before, between the flanges 34 and the inturned ends of the sections 12.

It will be seen from what has been described that the present invention has most of the advantages of a solid tire combined with those of a pneumatic tire. A tire constructed in accordance with the invention cannot be punctured and therefore cannot be ruined by being run flat. On the other hand, while being puncture-proof, it has much of the resilient qualities of the ordinary pneumatic tire.

A further advantage of the present construction and one not found in either conventional type of tire is that when the tread is worn out, it may be replaced by unskilled labor without vulcanizing or other expensive processes.

The tire, when once assembled, seldom requires attention and since the inclosed pneumatic tire is not subjected to cuts and abrasions or other deleterious influences, it holds its air much better than if exposed and thus seldom needs to be re-inflated.

The air cushions provided in the solid tread allow the same to yield, particularly in turning corners or the like, thus preventing too great wear of the same.

What is claimed is:—

1. A tire comprising a pneumatic tire, a metallic outer casing comprising two annular rings surrounding the sides and rim-engaging portions of the tire, said rings being locked together on the rim side of the tire and exposing the tread portion of the latter, a flexible ring seated upon the tread portion of the tire and engaging with the outer rings, whereby it holds the free edges of the rings together and in turn is held in place, and a tread secured upon said flexible ring.

2. A metallic tire comprising a pneumatic tire, a metallic outer casing comprising two rings surrounding the sides and rim-engaging portions of the tire, spaced locking plates set crosswise of the tire and having projecting lugs, said rings having perforations with which said lugs engage, whereby the rings are locked together on the rim side of the tire, said rings exposing the tread portion of the tire, and a solid tread mounted at and closing said exposed portion of the tire.

3. In combination with a pneumatic tire comprising an inner tube and outer casing, a metallic casing inclosing said outer casing and formed of two rings having inturned flanges at one edge, which flanges embrace the rim engaging portion of the outer casing and abut with each other, plates located outside the flanges and between the same and the rim of the wheel, and interlocking means provided on the plates to engage with the flanges of the rings to hold them from separation.

4. A vehicle wheel tire comprising a pneumatic tire, a protective outer casing of relatively stiff material surrounding the tire except at the tread portion thereof, said protective casing comprising two rings having inturned flanges abutted against each other on the rim-engaging section of the tire, said rings being bulged outwardly away from the sides of the tire, a series of plates running crosswise of a wheel rim and having projecting lugs, the flanges of the protective rings having perforations to engage with said upstanding lugs whereby the rings are held together, and the abutted flanges and the sides of the protective casing being adapted to fit upon a wheel rim.

5. A tire comprising a pneumatic tire, a protective outer casing of relatively non-yieldable material surrounding the tire except at the tread portion thereof, a flexible ring seated upon said tread portion, said flexible ring comprising a plurality of transversely curved sections, said sections being alternately broad and narrow, the outer casing being interlocked with the broad sections.

6. A tire comprising a pneumatic tire, a protective outer casing of relatively stiff material surrounding the tire except at the tread portion thereof, a linked ring seated upon said tread portion, the links of said ring being alternately broad and narrow, the broad links having side flanges and the protective casing being engaged with the flanges of the broad links whereby the linked ring is held in place.

7. A tire comprising a pneumatic tire, a protective outer casing surrounding the tire except at the tread portion thereof, a linked ring seated upon said tread portion, the links of said ring being alternately broad and narrow, the protective casing being engaged with the broad links whereby the linked ring is held in place, and a tread secured to the linked ring upon the narrow links thereof and holding the links of said ring together.

8. A tire comprising a tire, a protective outer casing of relatively stiff material surrounding the tire except at the tread portion thereof, a linked ring seated upon said tread portion, the protective casing being engaged with the linked ring, and a tread seated upon the linked ring between the outer edges of said casing and in coöperation with the protective casing holding the linked ring in proper position, said tread having flexible lips provided on each side thereof, said lips being fitted between the corresponding free edges of the protective casing and the adjacent sides of the linked ring.

9. In a tire comprising a pneumatic tire, a protective outer casing of relatively stiff material surrounding the tire except at the tread portion thereof which is exposed, said casing having its outer edges bent inwardly, a linked ring seated upon said tread portion, some of the links of said ring being flanged, and a tread seated upon the linked ring between the flanges thereoef, said tread having annular air cushions along the sides and annular flexible lips bounding the air cushions, the annular lips being fitted between the bent free edges of the protective casing and the flanges of the linked ring.

10. A tire comprising a pneumatic tire, a protective outer casing of relatively stiff material surrounding the tire except at the tread portion thereof, a linked ring seated upon said tread portion, and a tread seated upon the linked ring, said linked ring comprising a series of alternately broad and narrow plates, all of said plates having projecting flanges, the tread being fitted between the flanges of the narrow plates and the casing being connected to the flanges of the broad plates.

11. A tire comprising a pneumatic tire, a protective outer casing of relatively stiff material surrounding the tire except at the tread portion thereof, a linked ring seated upon said tread portion, and a tread seated upon the linked ring, said linked ring comprising a series of alternately broad and narrow plates, all of said plates having projecting flanges, the flanges of the narrow plates having breaks therein near the ends of said plates, resilient connecting plates made fast to the ends of the wide links and having protruding tongues at their outer ends, said tongues being adapted to fit in the breaks of the flanges of the narrow plates whereby the plates of the linked ring are removably secured together, the protective casing being interlocked with the flanges of the broad plates and the tread being secured between the flanges of the narrow plates.

12. A tire comprising a pneumatic tire, a protective outer casing of relatively stiff material surrounding the tire except at the tread portion thereof, a linked ring seated upon said tread portion, and a tread seated upon the linked ring, said linked ring comprising a series of alternately broad and narrow plates, all of said plates having projecting flanges, said tread having annular air cushions and annular lips bounding the air cushions, the annular lips being fitted between the corresponding free edges of the protective casing and the adjacent flanges of the narrow plates.

13. A tire comprising a pneumatic tire, a protective outer casing of relatively stiff material surrounding the tire except at the tread portion thereof, a linked ring seated upon said tread portion, and a tread seated upon the linked ring, said linked ring comprising a series of alternately broad and narrow plates, all of said plates having projecting flanges, the flanges of the narrow plates having breaks therein near the ends of said plates, resilient connecting plates made fast to the ends of the broad plates and having protruding tongues at their outer ends, said tongues being adapted to fit in the breaks of the flanges of the narrow plates whereby the plates of the linked ring are removably secured together, the protective casing being interlocked with the flanges of the broad plates and the tread being secured between the flanges of the narrow plates, said tread having annular air cushions and annular lips bounding the air cushions, the annular lips being fitted between the corresponding free edge of the protective casing and the adjacent flanges of the narrow plates.

14. A tire comprising a pneumatic tire, a protective outer casing surrounding the pneumatic tire except at the tread portion thereof, a linked ring seated upon said tread portion, a tread seated upon the linked ring, said ring comprising a series of alternately broad and narrow plates, all of said plates having projecting flanges, the flanges of the narrow plates having breaks therein near the ends of said plates, resilient connecting plates made fast to the ends of the wide links and having protruding tongues at their outer ends, said tongues being adapted to fit in the breaks of the flanges of the narrow plates whereby the plates of the linked ring are removably secured together.

In testimony that I claim the foregoing as my own, I have hereto affixed my signature in the presence of two witnesses.

WILLIAM H. NORTHALL.

Witnesses:
L. C. GORE,
SAM C. JAMES.